United States Patent
Hong et al.

(10) Patent No.: US 6,972,808 B2
(45) Date of Patent: Dec. 6, 2005

(54) CRT ASSEMBLY OF PROJECTION TELEVISION

(75) Inventors: Chang-wan Hong, Suwon (KR); Sang-hak Kim, Suwon (KR); Sung-soo Jung, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 737 days.

(21) Appl. No.: 09/725,905

(22) Filed: Nov. 30, 2000

(65) Prior Publication Data

US 2002/0054246 A1    May 9, 2002

(30) Foreign Application Priority Data

Aug. 12, 2000  (KR) ............... 20-00-46766

(51) Int. Cl.[7] ............................................. H04N 5/74
(52) U.S. Cl. ........................................ 348/749; 315/35
(58) Field of Search ................. 348/748, 749, 348/744, 776, 781; 313/35, 36; 315/35

(56) References Cited

U.S. PATENT DOCUMENTS

| | | | |
|---|---|---|---|
| 4,717,853 A | * | 1/1988 | Ezawa et al. .................. 313/35 |
| 4,740,727 A | * | 4/1988 | Inaida et al. ................... 313/36 |
| 4,777,532 A | | 10/1988 | Hasegawa |
| 4,982,289 A | * | 1/1991 | Mitani et al. ................ 358/237 |
| 5,644,278 A | * | 7/1997 | Takezawa .................... 335/210 |
| 5,877,583 A | * | 3/1999 | Meglio et al. ................. 313/35 |
| 6,130,497 A | * | 10/2000 | Takezawa et al. ............ 313/35 |
| 6,188,165 B1 | * | 2/2001 | Lee ............................... 313/44 |
| 6,384,874 B1 | * | 5/2002 | Ushizaka ..................... 348/749 |
| 6,456,341 B1 | * | 9/2002 | Jung ........................... 348/776 |

FOREIGN PATENT DOCUMENTS

JP    09-298708    11/1997

OTHER PUBLICATIONS

Korean Industrial Property Office action, Notice to Submit Response in corresponding Application No. 10-2000-46766 issued on Apr. 30, 2002.
English translation for Korean Industrial Property Office action, Notice to Submit Response in corresponding Application No. 10-2000-46766 issued on Apr. 30, 2002.

* cited by examiner

Primary Examiner—Paulos M. Natnael
(74) Attorney, Agent, or Firm—Robert E. Bushnell, Esq.

(57) ABSTRACT

A cathode-ray tube (CRT) assembly of a projection television includes a CRT for creating an image, a lens for magnifying the image created in the CRT and projecting the image onto a screen, and a coupler disposed between the CRT and the lens. A cooling liquid receptacle is provided within the coupler, and is filled with a cooling liquid. For that purpose, a cooling liquid pouring inlet is disposed on one side of the coupler for pouring the cooling liquid into the cooling liquid receptacle, and an oilpack is connected to the cooling liquid receptacle so that a portion of the cooling liquid is contained therein when the cooling liquid in the cooling liquid receptacle expands due to heat generated by the CRT. The oilpack comprises a sealed space, a pack holder disposed between the sealed space and the cooling liquid pouring inlet, and an oilpack coupling mechanism formed on the pack holder.

19 Claims, 6 Drawing Sheets

CRT ASSEMBLY OF PROJECTION TELEVISION

CLAIM OF PRIORITY

This application makes reference to, incorporates the same herein, and claims all benefits accruing under 35 U.S.C. § 119 from my application CRT ASSEMBLY OF PROJECTION TELEVISION field with the Korean Industrial Property Office on 12 Aug. 2000 and there duly assigned Serial No. 00-46766.

BACKGROUND OF THE INVENTION

1. Technical Field

The present invention relates to a cathode-ray tube (CRT) assembly of a projection television system, and more particularly, to a CRT assembly of a projection television having a pressure regulating structure for controlling the pressure of a cooling liquid for dispersing heat generated by the CRT.

2. Description of the Related Art

A projection television has been used for displaying an enlarged image on a screen. The enlarged imaged is projected from a cathode-ray tube (CRT) assembly including a CRT, a projection lens, and a coupler disposed between the CRT and the projection lens to couple the projection lense to the CRT. In order to disperse heat generated from the CRT, a cooling liquid receptacle and a pressure receptacle chamber are provided in the coupler.

In an effort to provide a pressure receptacle chamber, U.S. Pat. No. 4,777,532 to Hasegawa entitled *Receiver Projection Apparatus for A Projection Television* shows a conventional projection television having a pressure regulating chamber. The greater detailed structure of the conventional projection television is described in more detail below.

The conventional CRT, however, involves drawbacks in that the structure of the coupler and the pressure regulating chamber is complicated due to structural elements fixed to the coupler and the manufacturing cost is high due to the large number of parts and the large number of assembling steps.

SUMMARY OF THE INVENTION

To solve the above problems, it is an objective of the present invention to provide a cathode-ray tube (CRT) assembly of a projection television having an improved structure for controlling the pressure of a CRT cooling liquid contained within a cooling liquid receptacle of a coupler.

It is another object to provide a CRT assembly having a pressure regulating pack able to be placed in a narrow space within a projection television.

It is yet another object to provide a CRT assembly having a flexible pressure regulating pack to be easily assembled into the CRT assembly.

It is still yet another object to provide a CRT assembly having a pressure regulating pack able to reduce the number of parts and the manufacturing cost.

To achieve the above objective, the present invention provides a CRT assembly of a projection television including a CRT for creating an image, a screen, a coupler disposed between the CRT and the lens, a cooling liquid receptacle formed in the coupler and filled with a cooling liquid, a cooling liquid pouring inlet disposed on one side of the coupler to provide a passageway for the cooling liquid poured into the cooling liquid receptacle, and an oilpack connected to the cooling liquid receptacle so that a portion of the cooling liquid is contained in the oilpack when the cooling liquid in the cooling liquid receptacle expands by generated from the CRT.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
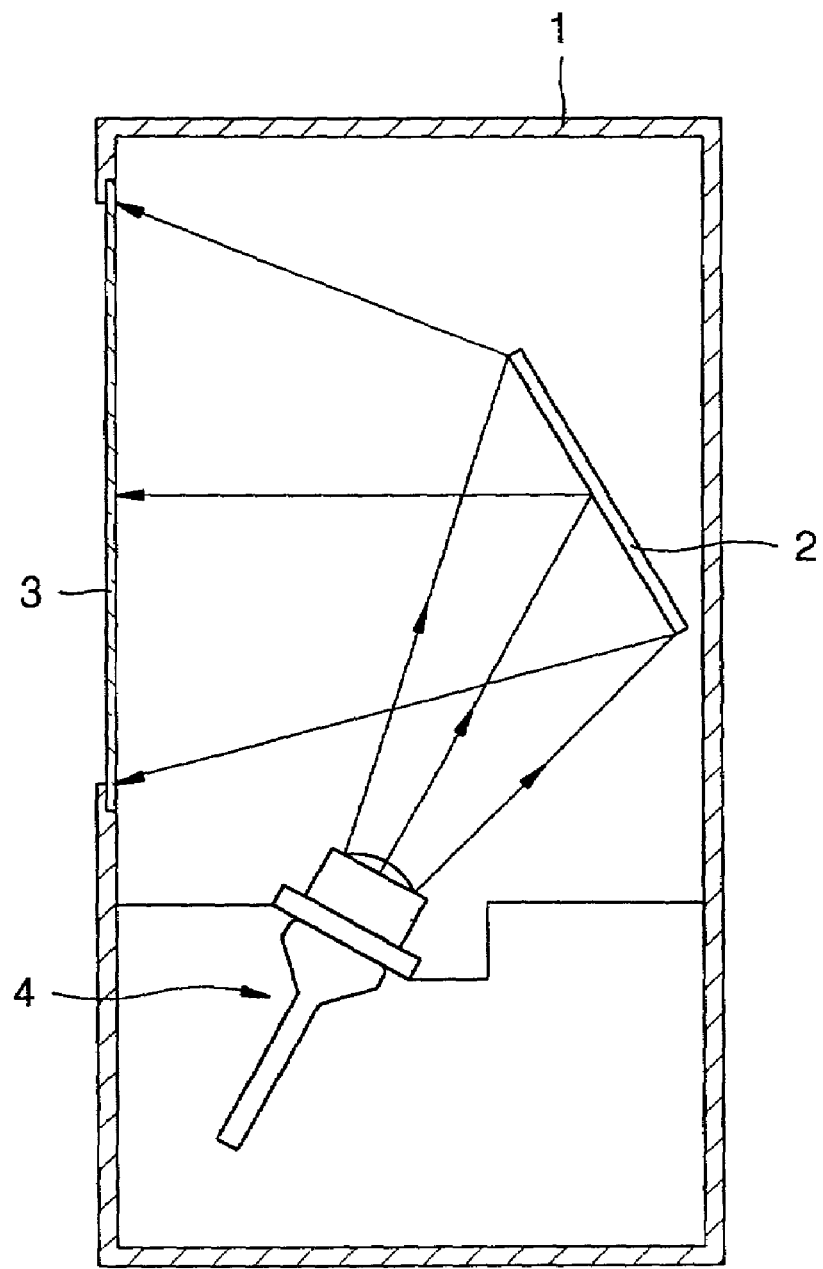
FIG. 1 is a schematic cross-sectional view of a general projection television.

FIG. 1 shows a projection television. An image produced and enlarged by a cathode-ray tube (CRT) assembly 4 installed within a main body 1 is reflected by a reflecting mirror 2 and projected onto a screen 3 disposed in front of main body 1.

Figure 2:
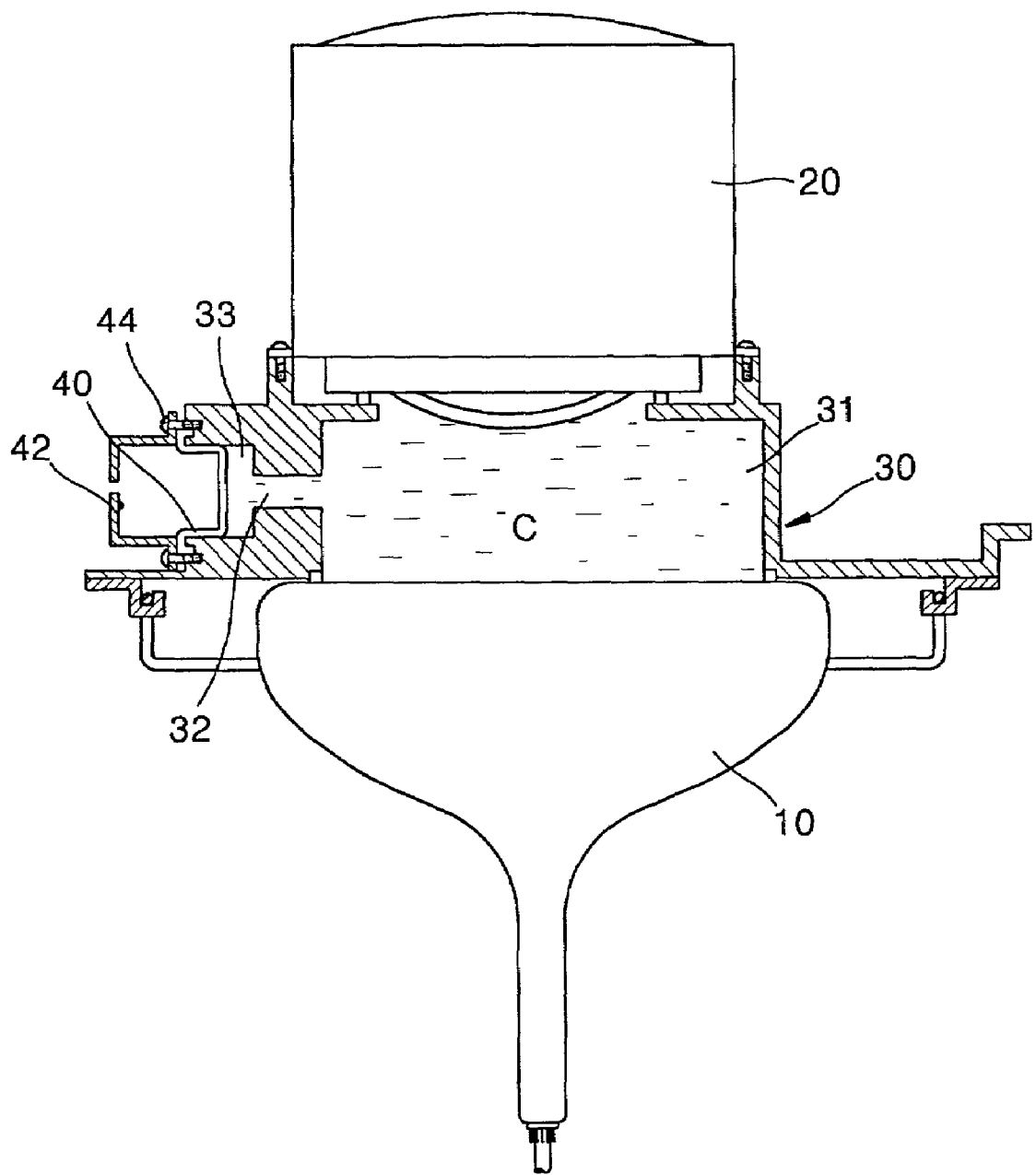
FIG. 2 is a cross-sectional view of a conventional cathode-ray tube (CRT) assembly of a projection television.

As shown in FIG. 2, conventional CRT assembly 4 includes a CRT 10 for creating an image, a lens 20 for magnifying the image of CRT 10 to project it onto the screen 3, and a coupler 30 for coupling CRT 10 to lens 20. A cooling liquid receptacle 31 filled with a cooling liquid C coupling CRT 10 to lens 20 is provided inside a frame of coupler 30. On a side of coupler 30, a cooling liquid pouring inlet 32 is disposed for pouring cooling liquid C into cooling liquid receptacle 31. A rubber buffer 40 and a holder cap 42 are connected to cooling liquid pouring inlet 32 so that cooling liquid C contained in cooling liquid receptacle 31 does not leak out when the volume of cooling liquid C is expanded by heat generated from CRT 10.

A flange portion 33 having a concave shape is provided for housing rubber buffer 40 connected to cooling liquid pouring inlet 32. With a rubber buffer 40 housed in flange portion 33, holder cap 42 presses a rim of rubber buffer 40 so that the rim may be sealed and fastened to coupler 30 by a screw 44. Rubber buffer 40 as a diaphragm prevents cooling liquid C from flowing out of flange portion 33, and when the cooling liquid C expands, it serves to control the pressure of cooling liquid C contained in cooling liquid receptacle 31 while being elastically deformed away from flange portion 33.

As described above, the conventional projection television CRT assembly 4 includes flange portion 33 housing rubber buffer 40 in coupler 30, and holder cap 42 fixed by screw 44 in order to couple rubber buffer 40 to coupler 30.

Thus, the manufacturing of coupler 30 is complicated, and a separate cap holder 42 and screw 44 are required for coupling rubber buffer 40 to coupler 30.

Figure 3:
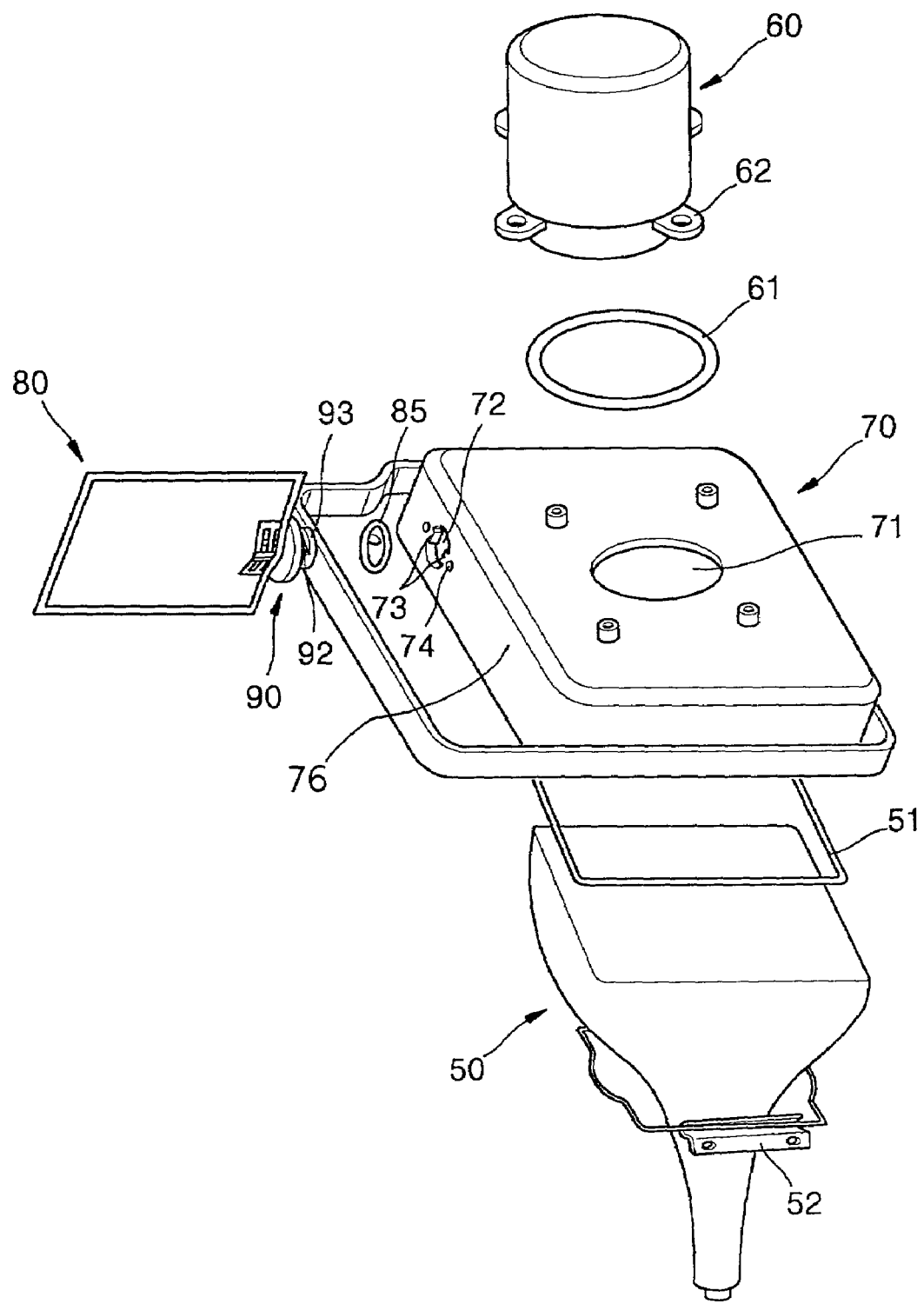
FIG. 3 is a perspective view of a CRT assembly of a projection television according to the principle of the present invention.
Figure 4:
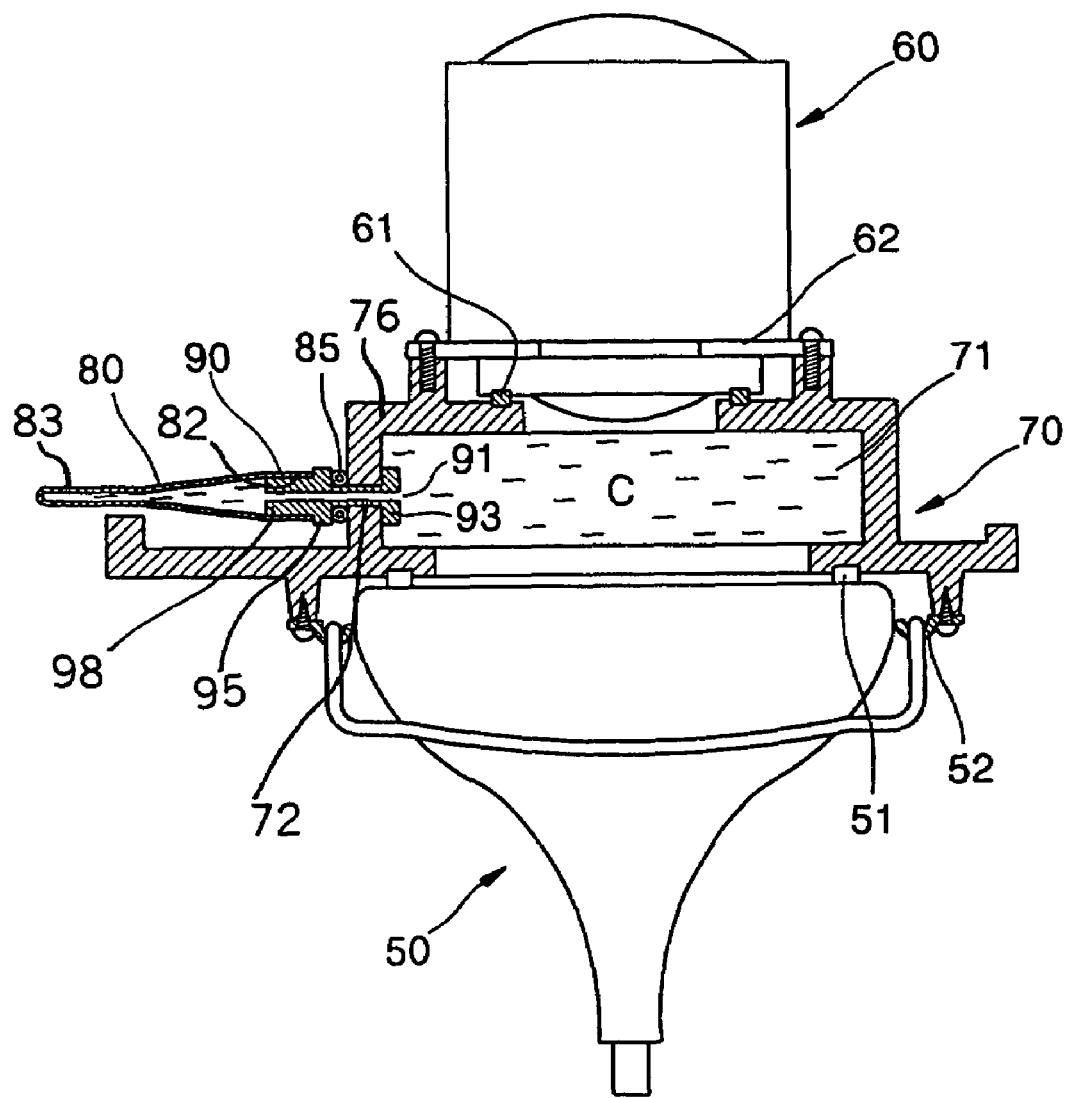
FIG. 4 is a schematic cross-sectional view of the CRT assembly of a projection television shown in FIG. 3.

Referring to FIGS. 3 and 4, a cathode-ray tube (CRT) assembly of a projection television according to the present invention includes a CRT 50 producing an image, a lens 60 magnifying the image of CRT 50 to project the image onto screen 3 of FIG. 1, a coupler 70 coupling CRT 50 to lens 60, and an oilpack 80 coupled to coupler 70. CRT 50 and lens 60 are sealed by coupler 70 when sealing members 51 and 61, respectively, are fixed between coupler 70 and CRT 50 and lens 60, respectively, through fixed brackets 52 and 62, respectively, by screws.

Coupler 70 has two opened sides each facing one of lens 60 and CRT 50. This space between the two opened sides and within coupler 70 is a cooling liquid receptacle 71 which will later be filled with a cooling liquid C. A cooling liquid pouring inlet 72 is formed on an inlet member 76 of coupler 70 disposed on a third side of coupler 70 to provide a passageway for pouring cooling liquid C into cooling liquid receptacle 71. Oilpack 80 is a bag-type pack made of two sheets of flexible material, such as vinyl, the edges of which are fused together to form a closed portion 83 and an open end 82. An extended portion 98 of a pack holder 90 is welded to open end 82, and then a supporting portion 95 of pack holder 90 is attached to cooling liquid pouring inlet 72 of coupler 70. During operation of the projection television, the temperature of cooling liquid C filled in cooling liquid receptacle 71 increases to about 90° C. due to heat generated by CRT 50. As the temperature of cooling liquid C increases, the volume of cooling liquid C increases, and then the pressure of cooling liquid receptacle 71 increases. The oilpack 80 receives an excessive portion of cooling liquid C through cooling liquid pouring inlet 72 in order to reduce the pressure, thereby preventing the pressure of cooling liquid receptacle 71 from increasing.

A through hole 91 is formed in a holding member 93, a supporting portion 95, and an extended portion 98 of pack holder 90 so that cooling liquid C may flow from cooling liquid receptacle 71 into the inside of closed end 83 of oilpack 80. A portion welded to the oilpack 80 is preferably diamond-shaped for easy welding. In this embodiment, an oilpack coupling unit is provided for simply fixing oilpack 80 to coupler 70 in one fixing step.

Figure 5:
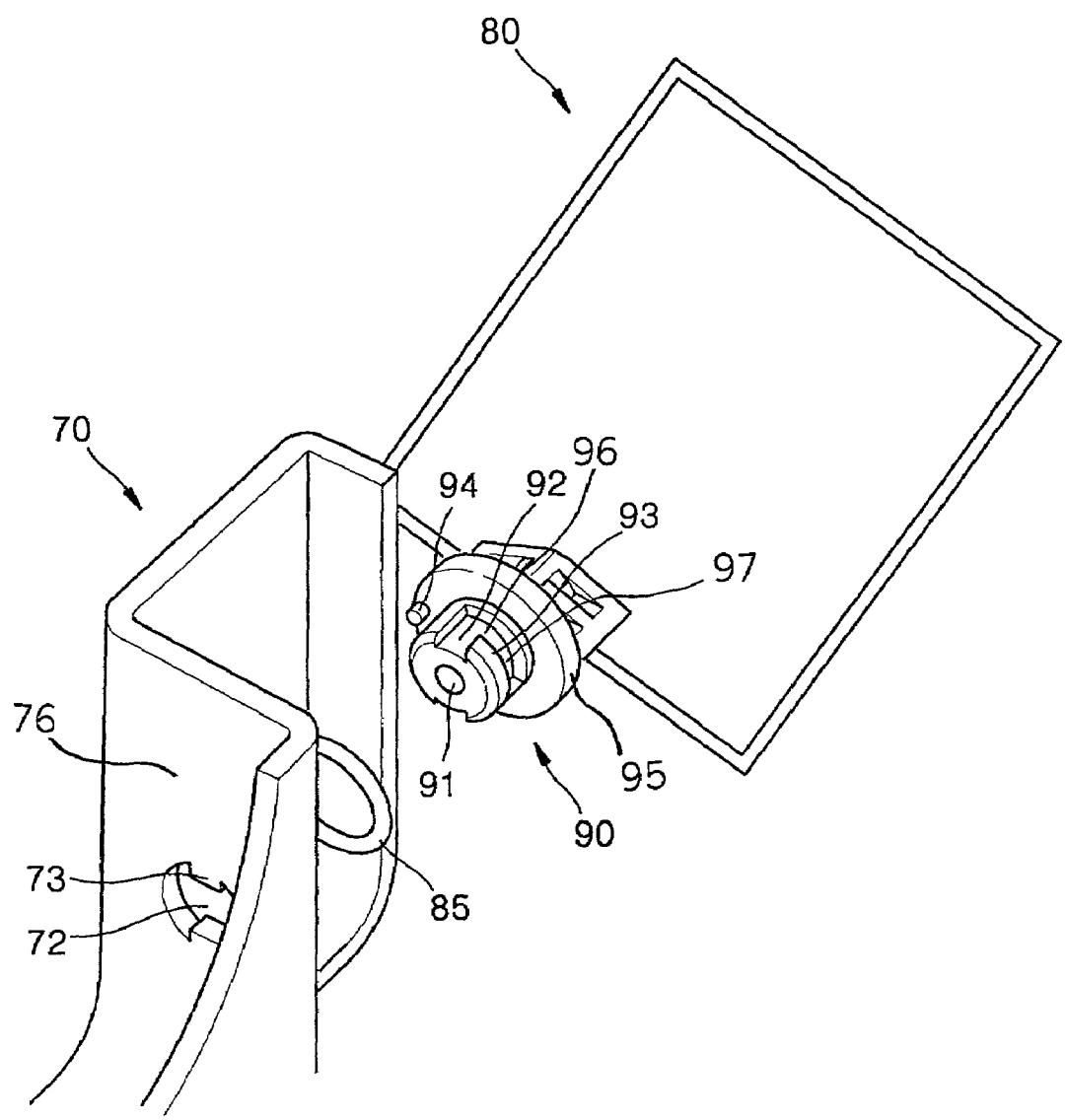
FIG. 5 is a partially exploded perspective view of a main portion of the CRT assembly of a projection television shown in FIGS. 3 and 4.

Referring to FIGS. 3 and 5, the oilpack coupling unit includes two protrusions 73 formed on cooling liquid pouring inlet 72 and depressions 74 formed on a side of coupler 70, a pair of guiding slots 92 including an axial slot 96 and a round slot 97, a holding portion 93, and a stopper 94 formed on supporting portion of pack holder 90. The protrusions 73 are projected toward a center of cooling liquid pouring inlet 72. One or more depressions 74 are formed on inlet member 76 of coupler 70 adjacent to cooling liquid pouring inlet 72, and preferably two depressions 74 are formed symmetrically around cooling liquid pouring inlet 72 and receive corresponding stopper 94. Two guiding slots 92 are disposed on opposite sides of pack holder 90 so that protrusions 73 are fitted into axial slot 96 and round slot 97 when pack holder 90 is inserted into cooling liquid pouring inlet 72. Holding portion 93 projects out from guiding slot 92 so that pack holder 90 can be caught on the protrusion 73, preventing separation from coupler 70 after axial slot 96 and round slot 97 of guiding slot 92 receive protrusion 73 of cooling liquid pouring inlet 72.

When pack holder 90 is coupled to coupler 70, an O-ring 85 is provided between supporting portion 95 of pack holder 90 and inlet member 76 of coupler 70 in order to prevent cooling liquid C from leaking out through a crevice between pack holder 90 and cooling liquid pouring inlet 72. Preferably, O-ring 85 is made of rubber material so that O-ring 85 may be elastically deformed when pack holder 90 is coupled to coupler 70. In the course of coupling pack holder 90 to coupler 70, O-ring 85 is elastically deformed and compressed between pack holder 90 and coupler 70. When the coupling is complete, a repulsive force occurs due to elastic recovery tendency of rubber material, so that pack holder 90 is pushed away from coupler 70. In this case, O-ring 85 maintains a sealed state between pack holder 90 and coupler 70 while holding portion 93 is sealed with inlet member 76 and cooling liquid pouring inlet 72.

Figure 6:
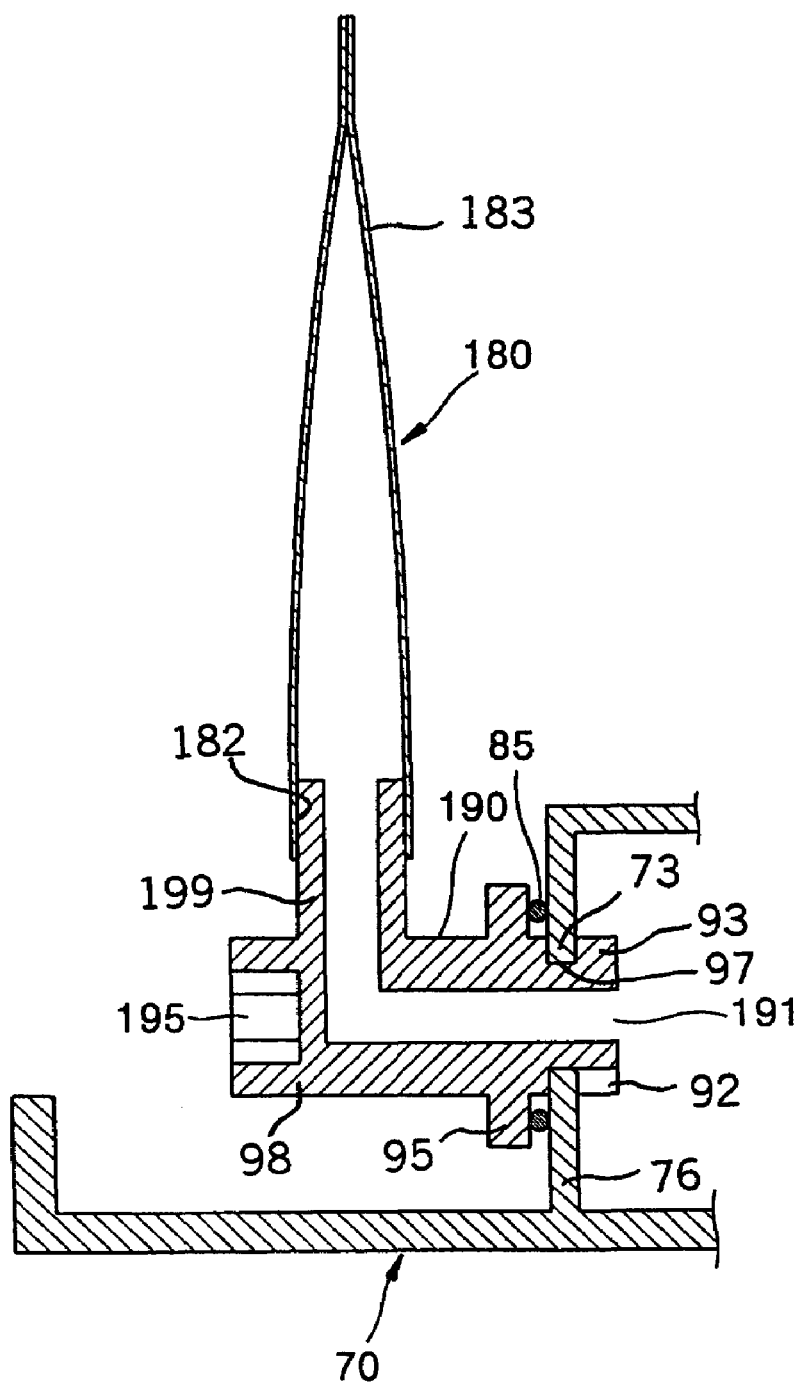
FIG. 6 is a cross-sectional view showing a CRT assembly of a projection television according to another embodiment of the invention, in which a pack holder is coupled to a coupler.

FIG. 6 is a cross-sectional view showing a pack holder coupled to a coupler according to another embodiment of the invention. A pack holder 190 is formed so that a path of a through hole 191 communicating with both cooling liquid receptacle 71 of coupler 70 and the inside of a closed portion 183 of an oilpack 180 is bent at a right angle within pack holder 190. Also, a hexagonal groove 195 is formed opposite to holding portion 93 of pack holder 190 coupled to inlet member 76 of coupler 70. An open end 182 of oilpack 180 is attached to a bent portion 199 of pack holder 190.

If oilpack 180 is repeatedly expanded or contracted, the oilpack 180 can be damaged by contact with coupler 70. For this reason, pack holder 190 is right-angled in order to prevent oilpack 180 from contacting coupler 70. Furthermore, when pack holder 190 is connected to coupler 70, friction occurs due to the O-ring 85 sitting between holder back 190 and coupler 70. Thus, the hexagonal groove 195 is formed so that a hexagonal wrench (not shown) may be used to rotate pack holder 190 and couple to coupler 70.

In the projection television CRT assembly according to the invention having a structure as described above, a bag-type oilpack 80, 180 is coupled to coupler 70 through pack holder 90, 190 in order to control the pressure of cooling liquid receptacle 71 formed within coupler 70. Thus, when cooling liquid C held in the cooling liquid receptacle 71 expands as the temperature increases with heat generated in CRT 50, cooling liquid C flows into oilpack 80, 180 through a through hole 91, 191 formed on pack holder 90, 190, thereby reducing the pressure of cooling liquid receptacle 71.

As described in the foregoing, a projection television CRT assembly according to the invention includes a bag type oilpack for receiving cooling contained in a cooling liquid receptacle of a coupler as the temperature of the cooling liquid rises and the cooling liquid expands. This makes it possible to prevent the pressure inside the cooling liquid receptacle from increasing, thereby providing a reliable product. Furthermore, the CRT assembly is constructed such that the oilpack is coupled and fixed to the cooling liquid pouring inlet of the coupler in one step using a holder back, which simplifies assembly and reduces the number of required parts. Accordingly, this reduction in the number of parts and assembly steps reduces the manufacturing cost.

What is claimed is:

1. A cathode-ray tube (CRT) assembly of a projection television, comprising:
    a CRT for creating an image;
    a lens for magnifying said image created by said CRT and for projecting said image onto a screen;
    a coupler disposed between said CRT and said lens for coupling said lens to said CRT, and defining a cooling liquid receptacle which is filled with a cooling liquid;

a cooling liquid pouring inlet formed on one side of said coupler, and providing a passage way for pouring the cooling liquid into said cooling liquid receptacle; and an oilpack connected to said cooling liquid pouring inlet, and communicating with said cooling liquid receptacle so that a portion of the cooling liquid is contained in said oil pack when the cooling liquid in said cooling liquid receptacle expands and said portion of the cooling liquid overflows from said cooling liquid receptacle;

said oilpack further comprising:

a sealed space;

a pack holder disposed between said sealed space and said cooling liquid pouring inlet, and having a through hole communicating with both said sealed space and said cooling liquid receptacle; and oilpack coupling means formed on said pack holder for coupling said pack holder to said cooling liquid pouring inlet.

2. The CRT assembly of claim 1, wherein said oilpack is made of a material having flexibility so that a volume of a sealed inner space of said oilpack varies due to flow of the cooling liquid into or out of said oilpack depending on expansion and contraction of the cooling liquid.

3. The CRT assembly of claim 1, said oilpack coupling means comprising:

a protrusion formed in said cooling liquid pouring inlet;

a guiding portion formed on said pack holder so that said protrusion is coupled to said guiding portion; and a holding portion formed on said pack holder and disposed within said cooling liquid receptacle to tightly couple said pack holder to said coupler when said protrusion is coupled to said guiding portion.

4. The CRT assembly of claim 3, said oilpack coupling means further comprising:

a depression formed adjacent to said cooling liquid pouring inlet; and a protrusion formed on said pack holder, and inserted into said depression when said pack holder is tightly coupled to said coupler.

5. The CRT assembly of claim 4, said oilpack coupling means further comprising an O-ring disposed between said pack holder and said cooling liquid pouring inlet for preventing leakage of cooling liquid.

6. The CRT assembly of claim 1, said pack holder comprising a supporting portion which is L-shaped so that said cooling liquid pouring inlet and an end portion of said pack holder form an angle while another end portion of said pack holder is coupled and parallel to said cooling liquid pouring inlet.

7. A cathode ray tube (CRT) assembly of a projection television, comprising;

a CRT for creating an image;

a lens for magnifying the image produced by said CRT and for projecting the image onto a screen;

a coupler disposed between said CRT and said lens for coupling said lens to said CRT, and including a receptacle which is filled with a cooling liquid;

an inlet formed on one side of said coupler, and communicating with said receptacle; and a pack unit coupled to said inlet, and including a pack, a pack holder disposed between said pack and said inlet, and having a first end coupled to an open portion of said pack and a second end coupled to said inlet, and a through hole formed in said pack holder and communicating with both said pack and said receptacle.

8. The CRT assembly of claim 7, wherein said pack unit is detachably attached to said inlet.

9. The CRT assembly of claim 7, wherein said pack is made of a flexible material and includes an open portion and a closed portion accommodating a portion of said cooling liquid flowing from said receptacle through said through hole.

10. The CRT assembly of claim 9, wherein a volume of said pack varies in accordance with the portion of said cooling liquid flowing from said receptacle.

11. The CRT assembly of claim 7, wherein said pack holder includes a first portion and a second portion which are perpendicular to each other.

12. The CRT assembly of claim 7, said pack holder including a portion which has a structure for rotating said pack holder when said pack holder is connected to said inlet.

13. The CRT assembly of claim 7, said pack holder comprising a supporting portion and a holding portion, each disposed on a respective opposite side of said inlet after said holding portion has been inserted into said inlet.

14. The CRT assembly of claim 13, further comprising:

a protrusion formed on said inlet; and a guiding slot into which said protrusion is inserted when said holding portion is inserted into said inlet.

15. The CRT assembly of claim 14, said guiding slot comprising:

an axial slot into which said protrusion is inserted when said holding portion is inserted into said inlet; and a round slot into which said protrusion is inserted when said holding portion rotates about a center of said inlet after said holding portion is inserted into said inlet.

16. The CRT assembly of claim 15, further comprising:

a depression formed around said inlet; and a stopper formed on said holding portion of said pack holder, and inserted into said depression after said protrusion has been inserted into said round slot.

17. The CRT assembly of claim 13, further comprising a ring inserted between said supporting portion and a side of said inlet to seal said inlet.

18. The CRT assembly of claim 13, said through hole comprising a first hole portion formed inside a first portion of said pack holder and a second hole portion formed inside a second portion of said pack holder, said first hole portion being perpendicular to said second hole portion.

19. A cathode ray tube (CRT) assembly, comprising:

a CRT;

a lens for projecting an image produced by said CRT onto a screen;

a coupler disposed between said CRT and said lens for coupling said lens to said CRT, and having a receptacle filled with a cooling liquid, and having an inlet;

a pack having a sealed portion and an open end;

a pack holder disposed between said pack and said coupler, and having a first end detachably attached to said inlet of said coupler, and having a second end coupled to said open end of said pack; and a through hole formed in said first end of said pack holder, and communicating with both said receptacle and an interior of said sealed portion of said pack.

* * * * *